(No Model.)  6 Sheets—Sheet 1.

G. V. FRYE & B. B. CARTER.
MACHINE FOR CUTTING CANDY.

No. 543,930.  Patented Aug. 6, 1895.

Fig. 1.

Witnesses.
Cornelia Spens
C. B. Lewis

Inventors
Byron B. Carter
George V. Frye by Geo. E. Waldo
Atty.

(No Model.) 6 Sheets—Sheet 3.

G. V. FRYE & B. B. CARTER.
MACHINE FOR CUTTING CANDY.

No. 543,930. Patented Aug. 6, 1895.

Fig. 3.

Witnesses.
Cornelia Spens
B. Lenié

Inventors
Byron B. Carter.
George V. Frye.
by Geo. E. Waldo.
Atty.

(No Model.) 6 Sheets—Sheet 4.

G. V. FRYE & B. B. CARTER.
MACHINE FOR CUTTING CANDY.

No. 543,930. Patented Aug. 6, 1895.

Fig. 4.

Witnesses
Cornelia Spens
B. Luis

Inventors
Byron B. Carter.
George V. Frye.

by Geo. E. Waldo.

Atty.

(No Model.) 6 Sheets—Sheet 5.

G. V. FRYE & B. B. CARTER.
MACHINE FOR CUTTING CANDY.

No. 543,930. Patented Aug. 6, 1895.

Witnesses
F. W. Biedermann
C. Everett Johnson

Inventors
Byron B. Carter.
George V. Frye.

by Geo. E. Waldo.
their Atty.

(No Model.) 6 Sheets—Sheet 6.

G. V. FRYE & B. B. CARTER.
MACHINE FOR CUTTING CANDY.

No. 543,930. Patented Aug. 6, 1895.

Fig. 6.

Witnesses.
Cornelia Spens

Inventors.
Byron B. Carter
George V. Frye by Geo. E. Waldo
Atty.

Figure

UNITED STATES PATENT OFFICE.

GEORGE V. FRYE, OF CHICAGO, AND BYRON B. CARTER, OF HINSDALE, ILLINOIS.

MACHINE FOR CUTTING CANDY.

SPECIFICATION forming part of Letters Patent No. 543,930, dated August 6, 1895.

Application filed May 12, 1894. Serial No. 511,028. (No model.)

*To all whom it may concern:*

Be it known that we, GEORGE V. FRYE, residing at Chicago, in the county of Cook, and BYRON B. CARTER, residing at Hinsdale, in the county of Du Page, State of Illinois, citizens of the United States, have invented new and useful Improvements in Machines for Cutting Candy, of which the following is a specification.

This invention relates to improvements in machinery for cutting caramels and other substances of substantially the same consistency.

A principal object of the invention is to provide an improved machine adapted to cut caramel-stock, delivered thereto in the form of mats, into the square or rectangular caramels of commerce.

In the best form thereof now known to us a machine embodying our invention comprises an intermittently-actuated sectional table upon which the stock is supported, intermittently-actuated pressure-rolls adapted to hold the mat of stock firmly upon and immovable relatively to the bed of the table, a plurality of slitting cutters, a transverse cutting-knife, and in the various other features, combinations of features, and details of construction hereinafter described, and then specifically pointed out in the appended claims.

In the accompanying drawings a machine embodying our invention is fully illustrated.

Referring now to the drawings, the main frame of the machine, designated as a whole by A, consists of right and left hand frame-pieces $A'$ $A^2$ connected by stay rods or bolts $a$. Upon the frame A the operative parts of the machine are supported and are all actuated from a main driving-shaft $A^3$, connected with some suitable source of power by means of a belt passing over fast and loose pulleys $A^4$ $A^5$. In its passage through the machine and during the operation of cutting the mat of stock is supported upon a bed or table, indicated as a whole by B. The table B consists of a plurality of sections $B'$, extending transversely of the machine and attached to corresponding links of sprocket-chains or link-belts $B^2$, adjusted to sprocket-wheels $B^3$, carried upon transverse shafts $B^4$ $B^5$, mounted so as to rotate freely in opposite ends of the main frame A. Secured to and preferably formed integral with the frame-pieces $A'$ $A^2$ of the machine are brackets or ledges $B^6$, on which the table is supported in its passage under the knives, treads or tracks $b$ being formed thereon, extending longitudinally thereof, upon which bear antifriction-rolls $b'$, suitably mounted in the chain-belts or sprocket-chains $B^2$ in a familiar manner.

Figure 3:
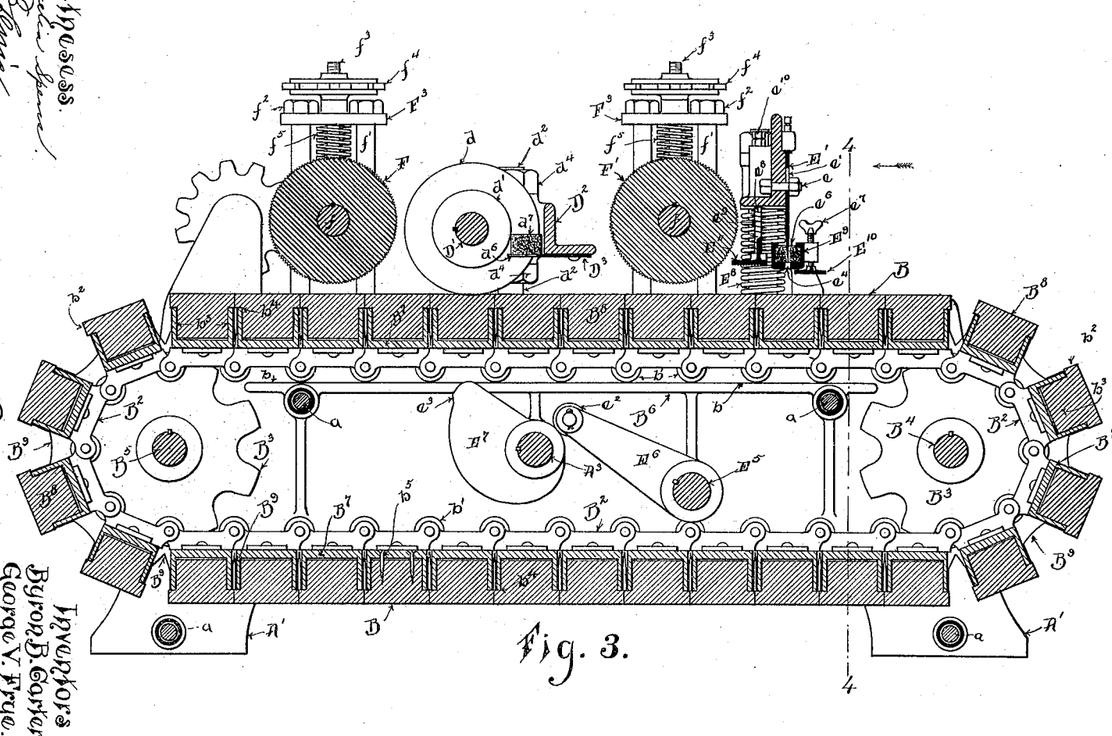
Fig. 3 is a vertical longitudinal section thereof on the line 3 3 of Fig. 4.
Figure 4:
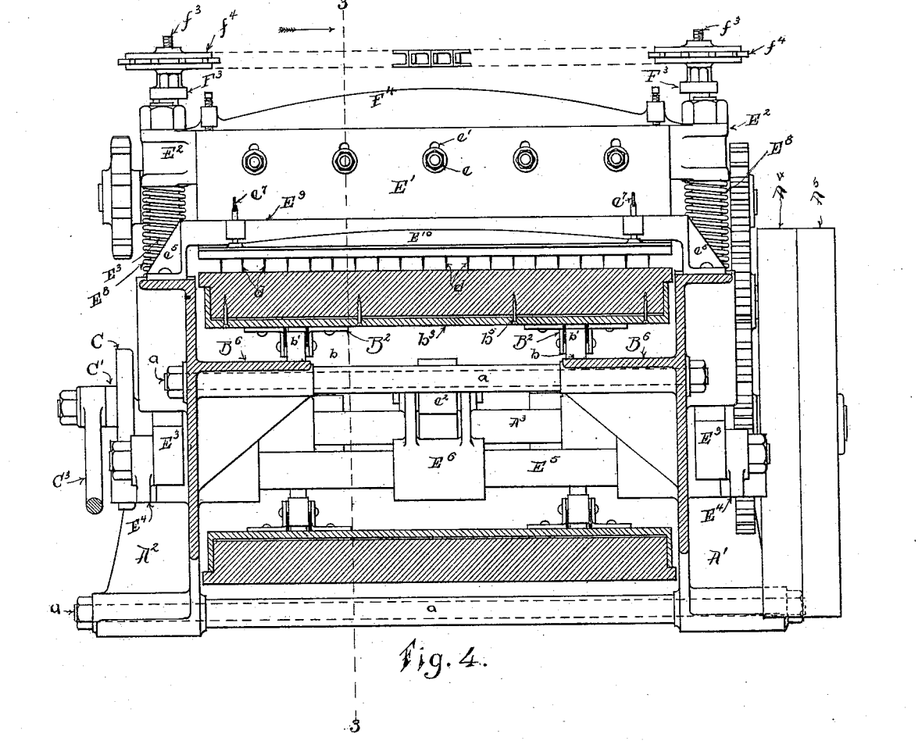
Fig. 4 is a transverse sectional view of the machine on the line 4 4 of Figs. 2 and 3.

The sections $B'$, comprising the bed or table B, may be of any desired construction and material that will insure necessary strength and stiffness in the structure. The preferable form thereof, however, is illustrated in Figs. 3 and 4, and consists of a hollow iron base-plate $B^7$, open on top, to which is secured a hard-wood block or facing $B^8$ desirably maple or the like. The upper or outer portions $b^2$ of the blocks or facings $B^8$ have a width equal to the length of the links of the chain-bolts $B^2$, while the lower or inner portions $b^3$ thereof are reduced so that they will enter the recesses formed in the base-plates $b^7$, the shoulders $b^4$ formed on said blocks $B^8$, at the juncture of the upper and lower portions $b^2$ $b^3$ thereof, resting on the edges of the sides of said base-plates $B^7$, forming the recesses therein.

The wooden blocks $B^8$ are secured to the base-plates $B^7$ by means of screws $b^5$, as shown, or in other desired manner; also, in order to prevent the material being operated upon from adhering to the blocks $B^8$ said blocks are boiled in paraffin until thoroughly permeated thereby.

The bases $B^7$ are somewhat narrower than the upper portions $b^2$ of the wooden blocks $B^8$. The adjacent sides of adjacent base-plates will thus be separated by the same distance, and this space is closed so as to prevent objects falling through into the interior of such table by aprons B³, the opposite edges of which are attached to the adjacent sides of adjacent base-plates. Said aprons are preferably made of oiled sheep-skin to prevent the adhesion thereto of the candy.

To the bed or table B an intermittent movement is imparted by a feed mechanism, as follows: Secured to the main driving-shaft A³ of the machine is a disk C, to which is pivoted, eccentrically to the center of rotation thereof, a lever C', in the free end of which is secured a stud $c$, which projects through an opening or slot $c'$ in the disk C and to the end of which is threaded a clamping-nut $c^2$. Threaded into the edge of the disk C, so as to extend into the opening or slot $c'$ and come into contact with the stud $c$, is an adjusting-screw C². Pivoted to the lever C', so that its pivotal point will be eccentric to the center of rotation of the disk C, is a link C³, the other end of which is pivoted to the end of a rock-lever C⁴, loosely pivoted upon the end of the shaft B⁴, adjacent to a ratchet-wheel C⁵, secured to the table-supporting shaft B⁴, the teeth of which are engaged by a pawl or pawls $c^3$, pivoted to the free end of said rock-lever C⁴. If desired a single pawl may be employed, but in the preferable construction a plurality of pawls are used, three being shown in the drawings. The pawls $c^3$ are so located relatively to each other that the free ends thereof are separated by a distance equal to a multiple of the pitch of the ratchet-wheel and a fraction thereof, said fraction being such a part of the whole pitch as one is of the whole number of pawls or a multiple thereof. By this arrangement it is possible to obtain desired fineness of feed with a desirable coarseness of pitch in the ratchet-wheel, whereby it is insured that the pawls will not become disengaged therefrom. It is also obvious that the feed may be changed when desired through the medium of the adjusting-screw C², whereby the eccentricity of the point of pivotal attachment of the link C³ to the lever C', and relatively to the center of rotation of the disk C, may be quickly and conveniently changed.

By providing an index-finger on the lever C' and by suitably graduating the face of the disk C, all in the manner shown, convenient means are provided for indicating the amount of the feed at any time.

The cutting mechanism comprises a gang of slitting-cutters and a transverse cut-off knife. The gang of slitting-cutters, which is designated as a whole by D, consists of circular cutters $d$, mounted on a transverse shaft or arbor D', to which they are keyed or otherwise secured, so as to rotate therewith, collars or washers $d'$ being placed on said shaft between said cutters to maintain adjacent cutters desired distances apart. The shaft D' has suitable bearings formed in the ends of a frame or yoke D², which is supported upon studs $d^2$, secured in the frame-pieces A' A², and which pass through holes in said frame or yoke, and nuts $d^4$ being threaded to said studs above and below said frame or yoke. The yoke D², together with the gang of cutters D, is thus rendered adjustable toward and from the bed B of the machine. Preferably, also, and in order to facilitate the changing of the gang of cutters D the bearings of the shaft D' will be provided with movable caps $d^5$; but this is not essential. Preferably the slitting-cutters $d$ will be driven at such a rate that their cutting-edges will run faster than the table moves during the operation of feeding. The result will thus be that they will have a drawing cut as they pass through the mat of stock.

Figure 1:
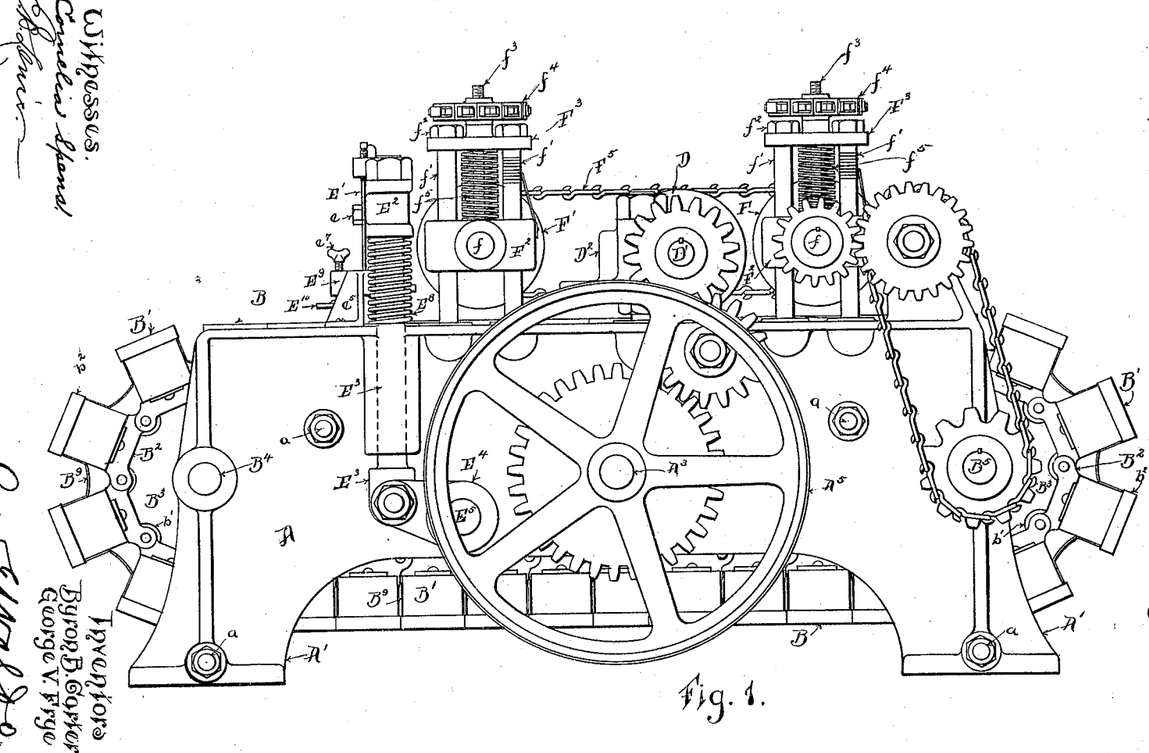
Figure 1 is a right-side elevation of the machine.
Figure 2:
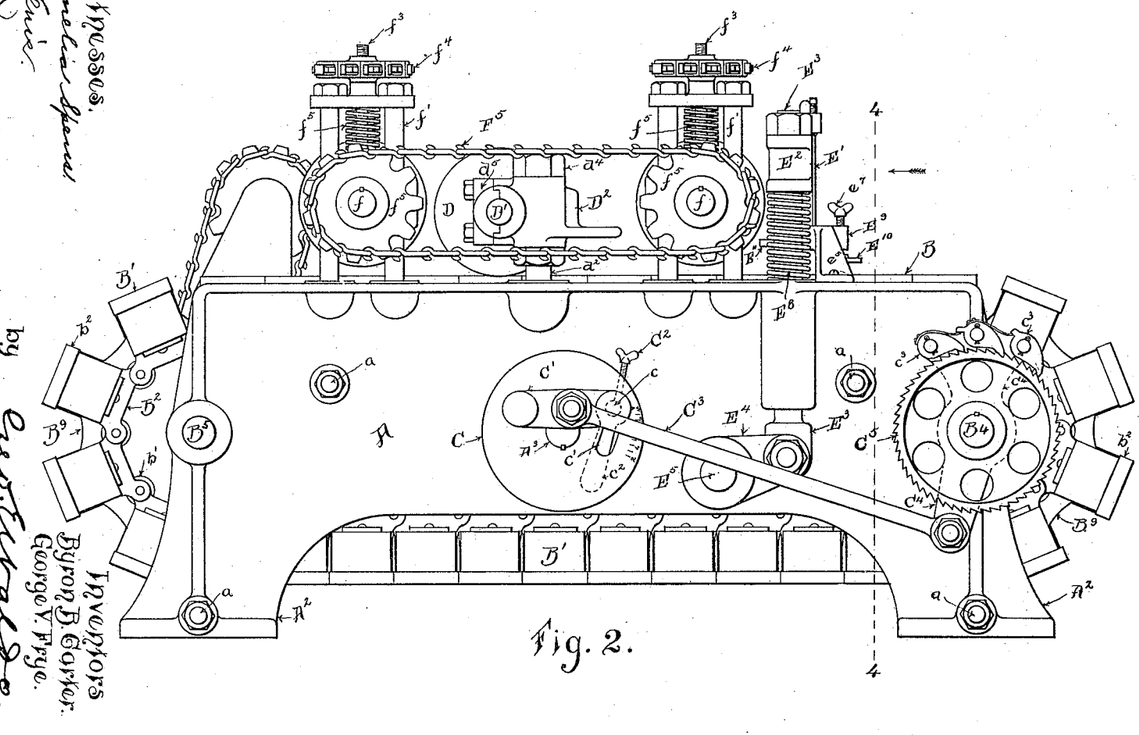
Fig. 2 is a left-side elevation thereof.
Figure 6:
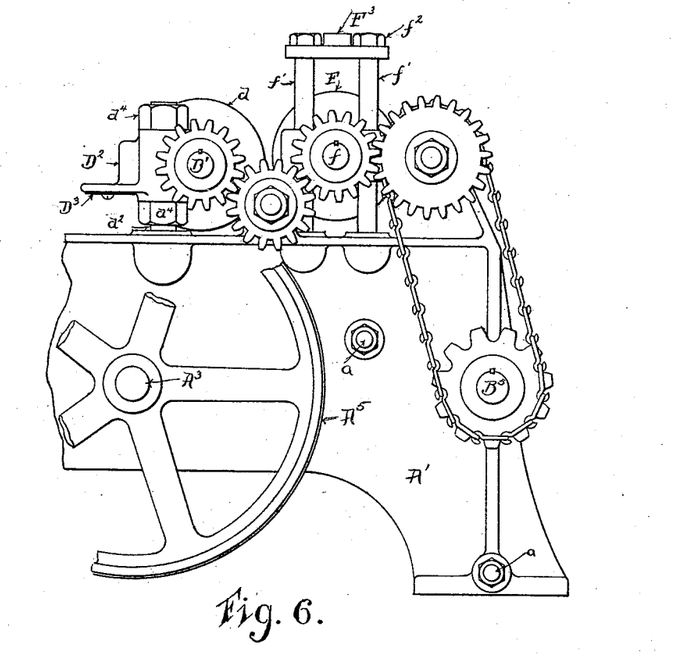
Fig. 6 is a view showing means for driving the slitting cutters intermittently simultaneously with the movement of the bed or table.

The cutter-shaft D' may be driven either with a continuous motion by means of suitable connection with the main driving-shaft A³, as clearly shown in Fig. 1, or it may be driven intermittently during the feeding of the table by means of suitable operative connection with one of the intermittently-actuated table-supporting shafts B⁴ B⁵, as clearly shown in Fig. 6.

Secured to the under side of the frame or yoke D² is a plate of sheet metal D³, in which is formed a series of slots $d^6$. Each of the slots $d^6$ is slightly wider than the thickness of the cutters $d$, and the distance from center to center of the adjacent slots is equal to the distance from center to center of adjacent cutters $d$, and the plate D³ is so located that the cutters $d$ run or pass through said slots $d^6$. The free edge of said plate D³ thus projects inwardly beyond the cutting-edges of said cutters $d$ and constitutes the same a stripper-plate, adapted to prevent the stock from winding around said gang of cutters D.

In order to prevent the candy-stock from adhering to the cutters, means are provided for keeping the cutting-edges thereof always coated with a film of some lubricating substance—water or any suitable oil—which will render said knives and candy non-adhesive. Convenient means for this purpose comprise pads of felt or other suitable absorbent material $d^7$, secured to the edge of the stripper-plate between adjacent cutters in such manner as to be in constant contact with the sides thereof adjacent to their cutting-edges. By saturating said pads or pieces of felt with water, suitable oil, or other desired substance the sides of said cutters, where they come into contact with said pads, will thus always be covered with a thin coating or film of the substance with which the pads are saturated.

Figure 7:
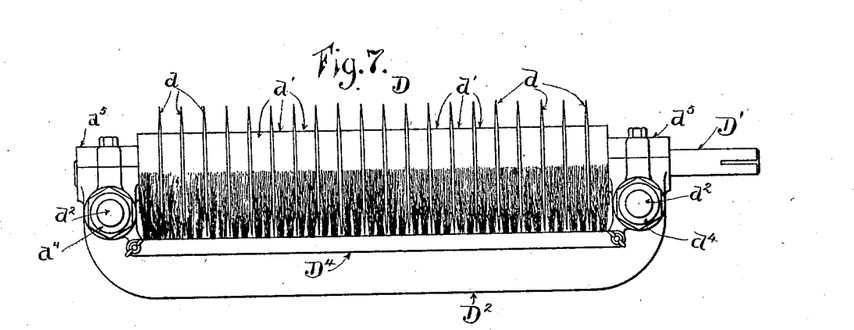
Figs. 7 and 8 illustrate a modification of the means for lubricating the slitting-cutters.
Figure 8:
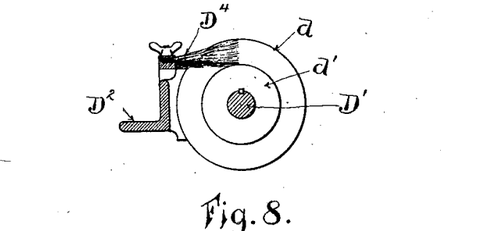

In Figs. 7 and 8 of the drawings we have illustrated a modification of the means for lubricating the slitting-cutters. As shown, said means comprise a hair or bristle brush D⁴, the back or frame of which is attached to the yoke D², the free ends of the hairs or bristles extending or projecting inwardly beyond the cutting-edges of the slitting-cutters $d$ and in continuous contact with the same. The hair or bristles of said brush, like the pads $d^7$, are saturated with oil or other desired lubricant. The brush $D^4$ is adapted for use either with or without the stripper-plate $D^3$, and is advantageous for the reason that it may be cleansed. As illustrated in said Figs. 7 and 8, no stripper-plate is shown.

For ordinary purposes a desirable size for the cutters is about five inches in diameter by about one-eighth of an inch in thickness, said cutters being beveled to an end at their peripheries. In properly separating the strips or pieces of candy, and to insure that they will not become stuck together after passing through the slitting-cutters, the shape of the cutters adjacent to the cutting-edges performs an important function.

Figure 5:
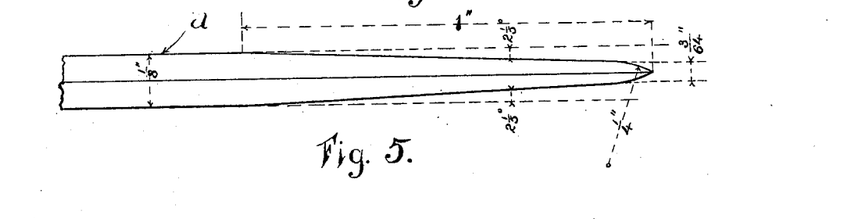
Fig. 5 is a diagrammatic view showing the form of the cutting-knives.

In Fig. 5 a cutter is shown enlarged, which is of the preferable form now known to us, and may be described as follows: Beginning at a point about one inch (1″) from the edge of said cutters both sides thereof are symmetrically beveled relatively to the center line or center plane thereof, and substantially uniformly, in such manner as to leave said cutter about three sixty-fourths of an inch ($\frac{3}{64}$″) thick at their peripheries—that is, at an angle of substantially two and one-fifth degrees, ($2\frac{1}{5}°$.) Said cutters are then brought to an edge by rounding off the sides thereof on circular lines of about one-quarter of an inch ($\frac{1}{4}$″) radius, which are tangent to the beveled portions thereof and which intersect at the middle of the cutter. The shape of the cutters admits of variation within certain limits, but the best results are obtained with cutters of substantially the shape described.

The cross-knife, which is herein designated as a whole by E, consists of a cutting-blade $E'$, adjustably attached to a cross-head $E^2$ by means of bolts or studs $e$, rigidly secured in the cross-head $E^2$, which pass through elongated holes or slots $e'$ in the knife $E'$. The cross-head $E^2$ is carried upon guide-rods $E^3$, which are fitted to and longitudinally movable in suitable upright bearings formed in the frame-pieces $A'$ $A^2$, and reciprocal movement toward and from the table B is imparted thereto by means as follows: To the lower ends of said guide-rods $E^3$ are pivoted the outer ends of levers or cranks $E^4$, keyed or otherwise rigidly secured to a shaft $E^5$, mounted in suitable bearings formed in the frame-pieces $A'$ $A^2$, and to which a desired oscillatory or rocking movement is given by means of a lever $E^6$, keyed thereto, the free ends of which engage the periphery of a cam $E^7$, secured to the main driving-shaft $A^3$ of the machine. In the preferable construction an anti-friction-roller $e^2$ is revolubly mounted in the free end of the lever $E^6$, so as to bear upon the cam $E^7$, thereby greatly reducing the friction incident to the operation thereof, all in a familiar manner. Springs $E^8$ inserted between the bottom of the cross-head and the tops of the frame-pieces $A'$ $A^2$, and coiled around the rods $E^3$ as guides, serve to maintain the cross-head $E^2$ and the knife $E'$, carried thereon, normally at the upper limit of their stroke, and operate also to maintain the free end of the lever $E^6$ constantly in contact with the periphery of the cam $E^7$. The shape of the cam $E^7$ is preferably such that the cross-head $E^2$ will descend with a slow movement until just before it reaches the lower limit of its stroke, when a projection or tappet $E^3$ on the face thereof strikes the lever $E^6$ and forces the cross-head and knife to the lower limit of their stroke with a sudden thrust or kick. The result of this movement is that the candy is cut much better than is possible with a knife moving with a uniform speed.

As the knife $E'$ reciprocates it plays or passes through a slit or elongated opening $e^4$ in the bottom of a U-shaped plate $E^9$, supported upon legs or brackets $e^5$, formed integral therewith, and the feet of which are rigidly secured to the frame-pieces $A'$ $A^2$. The legs or brackets $e^5$ will be of such length as will leave sufficient space between the bottom of the plate $E^9$ and the top of the table B to permit the free passage thereunder of the thickest stock upon which the machine is designed to operate, and at such a height, also, that the bottom of said plate will be slightly below the edge of the knife $E'$ when the knife is at the upper limit of its stroke. Strips of porous felt or other suitable absorbent material $e^6$ are placed between the cross-knife $E'$ and the sides of the plate $E^9$ and are saturated with any desired lubricant, thereby providing convenient means to prevent the candy from adhering to the cross-knife, all in a manner substantially identical with that heretofore described for lubricating the slitting-cutters D. Supported upon the plate $E^9$ adjacent to the front side of the cross-knife $E'$, by means of screws $e^7$ or otherwise, so as to be adjustable toward and from the table B, is a rigid stripper-plate $E^{10}$, which operates to prevent the candy or other stock from rising with the cross-knife $E'$.

Mounted on the cross-head $E^2$, in the rear of the cross-knife $E'$, is a spring presser-foot, the primary function of which is to prevent displacement or disarrangement of the mat of stock under the action of the cross-knife $E'$. Said presser-foot consists of a flat bar or foot $E^{11}$, in which are secured any desired number of rods $e^8$, which are fitted to and longitudinally movable in suitable guides or bearings in hubs or bosses formed integral with the cross-head $E^2$, inserted between the bottom of the cross-head $E^2$ and the top of the pressure-plate $E^{11}$, and about the rods $e^8$ as guides are springs $e^9$. Nuts $e^{10}$, threaded to the upper ends of the rods $e^8$, afford convenient means for adjusting the position of the presser-foot.

The relation of the various parts is such that when the cross-head and knife are at the upper limit of their movement the bottom of the presser-foot will be flush with or slightly above the bottom of the cross-knife stripper-plate $E^9$ and below the edge of the knife $E'$.

Preferably, also, the cutting-edge of the cross-knife E' will be of the same shape as the cutting-edges of the rotary cutters *d*, heretofore described.

The feeding of the mat of stock is effected by holding the same firmly upon the bed or table B, so that movement of the bed will be imparted to said mat of stock, and so, also, that said mat of stock will be held immovable relatively to the bed or table when said bed or table is at rest. The specific means for so holding the mat of stock upon said bed or table consist of pressure-rolls F F', supported above said bed or table and adjustable toward and from the same.

As shown, the rolls F F⁴ are of wood and are mounted upon shafts or axles *f*, having suitable bearings in blocks F² movable toward and from the table B on guide rods or studs *f'* rigidly secured in the frame-pieces A' A². To the upper ends of each pair of studs *f'* a cross-head or supporting-plate F³ is adjustably secured by means of nuts *f²* threaded to each of the studs *f'*. A stud *f³*, rigidly secured in the corresponding blocks F², passes through a hole in said supporting-plate, and a nut *f⁴* is threaded to the end thereof above said supporting-plate. A spring *f⁵* is inserted between each block F² and the corresponding supporting-plate F³. In the preferable construction shown the nuts *f⁴*, threaded to the studs *f³* above the supporting-plates F³, consist of sprocket-wheels, the hubs of which are tapped to fit the threaded ends of said studs. By adjusting chain-belts F⁴ to the sprocket-wheels at opposite ends of each pressure-roll convenient means are provided for adjusting the said rolls F F' toward and from the table B and to insure that the said rolls will always be parallel to the surface of said table after they have once been properly set or adjusted. Preferably, also, the pressure-rolls F F' will be scored or grooved longitudinally—that is, in a direction transverse to the direction of motion of the table B. By this means a regular feed is insured. The shafts *f* of the pressure-rolls F F' are connected by means of a chain-belt F⁵ adjusted to sprocket-wheels *f⁵*, keyed or otherwise rigidly secured thereto, and an intermittent movement is imparted thereto through suitable connection with one of the table-supporting shafts, as clearly shown in Fig. 1. The size of said rolls and the relation of the various parts are such that the surfaces of the pressure-rolls will move at the same speed as the table B. From the manner in which they are driven it is obvious that the table B and the pressure-rolls F F' will be simultaneously actuated. Further, it is obviously necessary that the cross-knife E and the feeding mechanism be alternately actuated—that is, that the operation of the cross-knife take place while the feed mechanisms are stationary, and, vice versa, that said knife be fully retracted during the operation of the feeding mechanism.

We claim—

1. In a machine for cutting caramels and other similar substances, the combination of slitting cutters, a reciprocating cross cutter, a cam applied to said cross cutter to impart thereto a sudden thrust or kick at the end of its cut, a bed or table upon which the mat of stock is supported, means to impart thereto an intermittent movement, and a roll or rolls adapted to press upon said mat of stock, and to hold the same immovable upon the bed or table, substantially as described.

2. In a machine for cutting caramels and other similar substances, the combination of slitting cutters, the reciprocating cross cutter, a cam applied to said cross cutter to impart thereto a sudden thrust or kick at the end of its cut, a bed or table upon which the mat of stock is supported, means to impart thereto an intermittent movement, and a roll or rolls adapted to press upon said mat of stock and to hold the same immovable upon the table, said rolls being intermittently driven simultaneously with and at the same surface speed as said bed or table, substantially as described.

3. In a machine for cutting caramels and other similar substances, the combination of slitting cutters, a reciprocating cross cutter, a cam applied to said cross cutter to impart thereto a sudden thrust or kick at the end of its cut, a bed or table upon which the mat of stock is supported, the surface of said bed or table being made of wood thoroughly permeated with paraffin, means to impart to said table an intermittent movement, a roll or rolls adapted to press upon said mat of stock and to hold the same immovable relatively to said bed or table, said roll or rolls being intermittently actuated simultaneously with and at the same surface speed as said bed or table, substantially as described.

4. In a machine for cutting caramels and other similar substances, the combination of slitting cutters, a reciprocating cross cutter, a cam applied to said cross cutter adapted to impart a sudden thrust or kick thereto at the end of its cut, a brush or pads or pieces of felt, saturated with oil or other desired lubricant being supported in contact with the slitting cutters adjacent to their cutting edges, pads or pieces of felt saturated with a desired lubricant supported in contact with the cutting edge of the cross cutter, a bed or table upon which the mat of stock is supported, the surface of said bed or table being made of wood thoroughly permeated with paraffin, means to impart to said table an intermittent movement, a roll or rolls adapted to press upon the mat of stock and to hold the same immovable relatively to said bed or table, said roll or rolls being intermittently actuated simultaneously with and at the same surface speed as said bed or table, substantially as described.

5. In a machine for cutting caramels or other similar substances, the combination of slitting cutters, a reciprocating cross cutter, a cam applied to said cross cutter, adapted to impart thereto a sudden thrust or kick at the end of its cut, an endless, sectional bed or table supported upon suitable wheels or drums, means to impart thereto an intermittent movement, said means comprising a ratchet wheel secured to the shaft of one of the supporting wheels or drums, a plurality of pawls adapted to engage the teeth thereof, said pawls being mounted at the free end of an oscillating lever, and the ends thereof being separated by a distance equal to the pitch of the ratchet wheel, or a multiple thereof, and a fraction thereof over, said fraction being one over the number of pawls, or a multiple thereof, a roll or rolls adapted to press upon the mat of stock and to hold the same immovable relatively to the bed or table, said roll or rolls being intermittently actuated simultaneously with and at the same surface speed as said bed or table, substantially as described.

6. In a machine for cutting caramels and other similar substances, the combination of slitting cutters, a reciprocating cross cutter, a cam applied to said cross cutter to impart thereto a sudden thrust or kick at the end of its cut, an endless, sectional bed or table supported upon suitable wheels or drums, a ratchet wheel secured to the shaft of one of the supporting wheels or drums, a pawl or pawls adapted to engage the teeth thereof, mounted at the free end of a lever pivoted adjacent to said ratchet wheel, and means to impart to said lever a variable, oscillatory movement, said means comprising a rotating disk, an arm pivoted thereto, a clamp to adjustably secure the other end of said arm to said disk, and a rod connecting said arm and pawl-carrying lever, all of said points of attachment being eccentric relatively to the center of rotation of said disk, a roll or rolls adapted to press upon the mat of stock and to hold the same immovable relatively to the bed or table, said roll or rolls being intermittently actuated simultaneously with and at the same surface speed as said bed or table, substantially as described.

7. In a machine for cutting caramels and other similar substances, the combination with the cutters, the bed or table upon which the stock is supported and means to impart an intermittent movement to said bed or table, of retaining devices to hold the mat of stock immovable relatively to said bed or table, substantially as described.

8. In a machine for cutting caramels and other similar substances, the combination with the cutters, the bed or table upon which the stock is supported, and means to impart thereto an intermittent movement, of a roll or rolls adapted to press upon the mat of stock and to hold the same immovable relatively to said bed or table, substantially as described.

9. In a machine for cutting caramels and other similar substances, the combination with the cutters, the bed or table upon which the stock is supported and means to impart an intermittent movement to said bed or table, of a roll or rolls adapted to press upon the mat of stock and to hold the same immovable relatively to said bed or table, said roll or rolls being intermittently actuated simultaneously with and at the same surface speed as the bed or table, substantially as described.

10. In a machine for cutting caramels and other similar substances, the combination with the cutters, an endless, sectional table upon which the stock is supported, and means to impart an intermittent movement thereto, of a roll or rolls adapted to press upon the mat of stock and to hold the same immovable relatively to said bed or table, substantially as described.

11. In a machine for cutting caramels and other similar substances, the combination with an endless table, comprising a plurality of sections, secured to corresponding links of chain belts, of sprocket wheels to which said chain belts are adjusted and means for imparting an intermittent movement to said table, said means comprising a ratchet wheel rigidly secured to one of the table supporting shafts and a plurality of pawls adapted to engage the teeth thereof, said pawls being mounted at the free end of an oscillating lever and the ends thereof being separated by a distance equal to a multiple of the pitch of the ratchet wheel, and a fraction thereof over, said fraction being one (1) over the number of pawls or a multiple thereof, substantially as described.

12. In a machine for cutting candy and other similar substances, the combination with an endless, sectional table, wheels or drums upon which said bed or table is supported, a ratchet wheel secured to the shaft of one of the table supporting wheels or drums, a pawl or pawls engaging said ratchet wheel, mounted at the free end of a lever pivoted adjacent to said ratchet wheel, of means to impart to said lever a variable, intermittent movement, said means comprising a rotating disk, an arm pivoted at one end to said disk, a clamp to adjustably secure the other end of said arm to said disk, and a rod connecting said arm with the pawl-carrying lever, substantially as described.

13. In a machine for cutting caramels and other similar substances, the combination with a reciprocating cutter of means to impart thereto a sudden thrust or kick at the end of its cut, substantially as described.

14. In a machine for cutting caramels and other similar substances, the combination with a reciprocating cutter of means to impart thereto a slow movement during the cutting stroke and means to impart thereto a sudden thrust or kick at the end of its cutting stroke, substantially as described.

15. In a machine for cutting caramels and other similar substances, the combination with a reciprocating cutter, of a cam applied thereto, adapted to impart to said cutter a sudden thrust or kick at the end of the cut, substantially as described.

16. In a machine for cutting caramels and other similar substances, the combination with a reciprocating cutter, or a cam applied thereto, which will impart a slow movement to said cutter during its cutting stroke ending in a sudden thrust or kick at the end of the cut, substantially as described.

17. In a machine for cutting caramels and other similar substances, the combination with a reciprocating cutter of a cam applied thereto to depress the same, said cam terminating in a projection or tappet adapted to impart a sudden thrust or kick to said cutter at the end of its cut, substantially as described.

18. In a machine for cutting caramels and other similar substances, the combination with a cross cutter of operative connection between said cutter and a rock shaft whereby oscillation of said shaft will depress said knife, means to impart oscillatory movement to said rock shaft, said means comprising a lever secured to said shaft and a lever with which the free end of said cam engages, said cam ending in a tappet or projection adapted to impart a sudden thrust or kick to said cutter at the end of its cut and means to raise said cutter, substantially as described.

19. An endless table comprising a plurality of sections and aprons adapted to close the openings between adjacent sections thereof, substantially as described.

20. An endless bed or table, comprising a plurality of sections, each consisting of a metallic base plate and a facing of wood or other similar material, substantially as described.

21. An endless bed or table, comprising a plurality of sections, each consisting of a hollow metallic base plate and a facing block of wood or other similar material secured thereto, a tongue or reduced portion of which engages or is inserted into the recess formed in the base block, substantially as described.

22. An endless bed or table comprising a plurality of sections, each consisting of a metallic base plate and a facing block of wood thoroughly permeated with paraffin, substantially as described.

23. In a machine for cutting caramels and other similar substances, the combination with the cutters and the movable bed or table, of a retaining roll or rolls so supported as to yield away from said bed or table, and stops to limit the approach of said rolls to said table, substantially as described.

24. In a machine for cutting caramels and other similar substances, the combination with the cutters, the bed or table and a retaining roll or rolls of blocks in which the retaining roll shafts have suitable bearings and said blocks being movable toward and from the bed or table on rigid studs, supporting plates secured between nuts threaded to the upper ends of said studs, other studs rigidly secured in the bearing blocks which pass through holes in said supporting plates, nuts threaded to the ends of said studs and a spring inserted between the bearing blocks and the supporting plates, substantially as described.

25. In a machine for cutting caramels and other similar substances, the combination with the cutters, the bed or table and a retaining roll or rolls of blocks in which the retaining roll shafts have suitable bearings and said blocks being movable toward and from the bed or table on rigid studs, supporting plates secured between nuts threaded to the upper ends of said studs, other studs rigidly secured in said bearing blocks and which pass through holes in said supporting plates, sprocket wheels threaded to said studs above said supporting plates, and chain belts, connecting the sprocket wheels at opposite ends of the same roll, substantially as described.

26. In a machine for cutting caramels and other similar substances, the combination with the cutting knives of pads or pieces of felt or other absorbent material supported in contact with the sides of said cutters adjacent to the cutting edges thereof, said pads being saturated with oil or other desired lubricant, substantially as described.

27. In a machine for cutting caramels and other similar substances, the combination with a gang of slitting cutters and a stripper plate therefor, of pads or pieces of porous felt or other absorbent material, secured to said stripper plate in contact with the cutters, adjacent to their cutting edges, said pads being saturated with oil or other desired lubricant, substantially as described.

28. In a machine for cutting caramels, the combination with a reciprocating cutter and a plate, through an opening in which said knife plays, of pads of absorbent material secured thereto in contact with the sides of said knife, said pads being saturated with oil or other desired lubricant, substantially as described.

29. Knives for cutting caramels and other similar substances both sides of which are symmetrically beveled, adjacent to their cutting edges, at an angle of substantially two and one-fifth degrees, to a thickness of three sixty-fourths of an inch ($\tfrac{3}{64}''$) at the edge, said cutters being brought to an edge by rounding off the beveled sides thereof on circular lines of about one quarter of an inch, ($\tfrac{1}{4}''$) radius, tangent to the beveled surfaces, and intersecting at the middle of said cutters, substantially as described.

In testimony that we claim the foregoing as our invention we hereunto set our hands this 28th day of March, 1894.

GEO. V. FRYE.
BYRON B. CARTER.

Witnesses:
A. T. BUNCH,
E. DARRAGH.